(12) United States Patent
McNab et al.

(10) Patent No.: US 12,387,755 B2
(45) Date of Patent: Aug. 12, 2025

(54) HARD DISK DRIVE DISK MEDIA CURVATURE MITIGATION

(71) Applicant: Western Digital Technologies, Inc., San Jose, CA (US)

(72) Inventors: Robert McNab, San Jose, CA (US); Daniel Nguyen, San Jose, CA (US); John Bianchini, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/544,189

(22) Filed: Dec. 18, 2023

(65) Prior Publication Data

US 2025/0201273 A1 Jun. 19, 2025

(51) Int. Cl.
*G11B 17/02* (2006.01)
*G11B 5/55* (2006.01)

(52) U.S. Cl.
CPC .......... *G11B 17/021* (2013.01); *G11B 5/5521* (2013.01)

(58) Field of Classification Search
None
See application file for complete search history.

(56) References Cited

U.S. PATENT DOCUMENTS

| | | | |
|---|---|---|---|
| 6,066,218 A * | 5/2000 | Kuhn | B29C 65/48 156/87 |
| 6,081,411 A | 6/2000 | Green et al. | |
| 6,134,076 A | 10/2000 | Boutaghou et al. | |
| 6,344,950 B1 | 2/2002 | Watson et al. | |
| 6,381,092 B1 * | 4/2002 | Suzuki | G11B 17/038 |
| 6,417,986 B1 | 7/2002 | Tran et al. | |
| 8,553,356 B1 | 10/2013 | Heo et al. | |
| 9,361,947 B1 | 6/2016 | Heo et al. | |
| 11,094,347 B1 | 8/2021 | Herdendorf et al. | |
| 11,749,308 B2 | 9/2023 | Kato | |
| 2004/0218495 A1 * | 11/2004 | Fechner | G11B 7/0956 369/53.19 |
| 2007/0201332 A1 * | 8/2007 | Kuroda | G11B 7/08511 369/53.14 |
| 2007/0297301 A1 * | 12/2007 | Verschuren | G11B 7/0956 369/44.32 |
| 2012/0063026 A1 | 3/2012 | Yang Juang et al. | |
| 2012/0075750 A1 * | 3/2012 | Chan | G11B 21/22 360/294 |

(Continued)

OTHER PUBLICATIONS

English text of Nakamo, JP-2005-020897A, published Jan. 20, 2005 (Year: 2005).*

(Continued)

*Primary Examiner* — Peter Vincent Agustin
(74) *Attorney, Agent, or Firm* — John D. Henkhaus

(57) ABSTRACT

A hard disk drive includes multiple disk media mounted on a spindle, where the outer diameter of each disk medium is offset from the inner diameter of the disk medium in a same direction along an axis of rotation of the spindle, and a load/unload ramp positioned, based on the offset, to align in correspondence with the outer diameters of the disk media. Thus, the curvature of irregular disk media, such as that associated with thinner and thinner disks, is mitigated by grouping similarly-characterized irregular disks together on a given spindle and compensating the ramp accordingly.

17 Claims, 4 Drawing Sheets

(56) References Cited

U.S. PATENT DOCUMENTS

2022/0293131 A1    9/2022  Herdendorf et al.
2023/0110894 A1*   4/2023  Suzuki .................. G11B 5/012
                                                        360/135

OTHER PUBLICATIONS

Johari, Nor Jihan et al., Effect of Stacking Quantity and Unstick Method on Flatness Efficiency: Optimizing and Utilizing Using Taguchi Method, PalArch's Journal of Archaeology of Egypt/ Egyptology (PJAEE), pp. 12800-12817, vol. 17 Issue 7, PJAEE.

Unknown, Disc flatness, 2 pages, downloaded at https://www.polytec.com/eu/surface-metrology/areas-of-application/data-storage/disc-flatness as early as Sep. 29, 2023.

Accelonix, Case Study: Flatness of Hard Disk Dive Component, 1 page, downloaded at https://accelonix.co.uk/metrology/non-contact-metrology/surface-engineering-applications/flatness-of-hard-disk-drive-component as early as Sep. 29, 2023.

Roberts, D. L. et al., A Flatness Measurement Technique For Magnetic Recording Disks, 1972, pp. 91-96, vol. 29, National Cash Register—Data Processing Division, downloaded at https://ui.adsabs.harvard.edu/abs/1972SPIE...29...91R/abstract.

\* cited by examiner

HARD DISK DRIVE DISK MEDIA CURVATURE MITIGATION

FIELD OF EMBODIMENTS

Embodiments of the invention may relate generally to hard disk drives and particularly to approaches to mitigating disk media curvature in a hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

Increasing the storage capacity of hard disk drives (HDDs) is one of the on-going goals of HDD technology evolution. In one form, this goal manifests in increasing the number of disks implemented in a given HDD. However, oftentimes maintaining a standard form factor is required, as characterized in part by the z-height of an HDD, which inherently provides challenges with respect to fitting more disks into a given HDD. More particularly, customer specifications and/or common design and operational constraints include load/unload requirements and operational shock (or "op-shock") requirements, which generally relate to an HDD's operational tolerance of a mechanical shock event. It remains a challenge to increase the number of disks while maintaining a standard form factor, while also reliably meeting load/unload and op-shock requirements.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
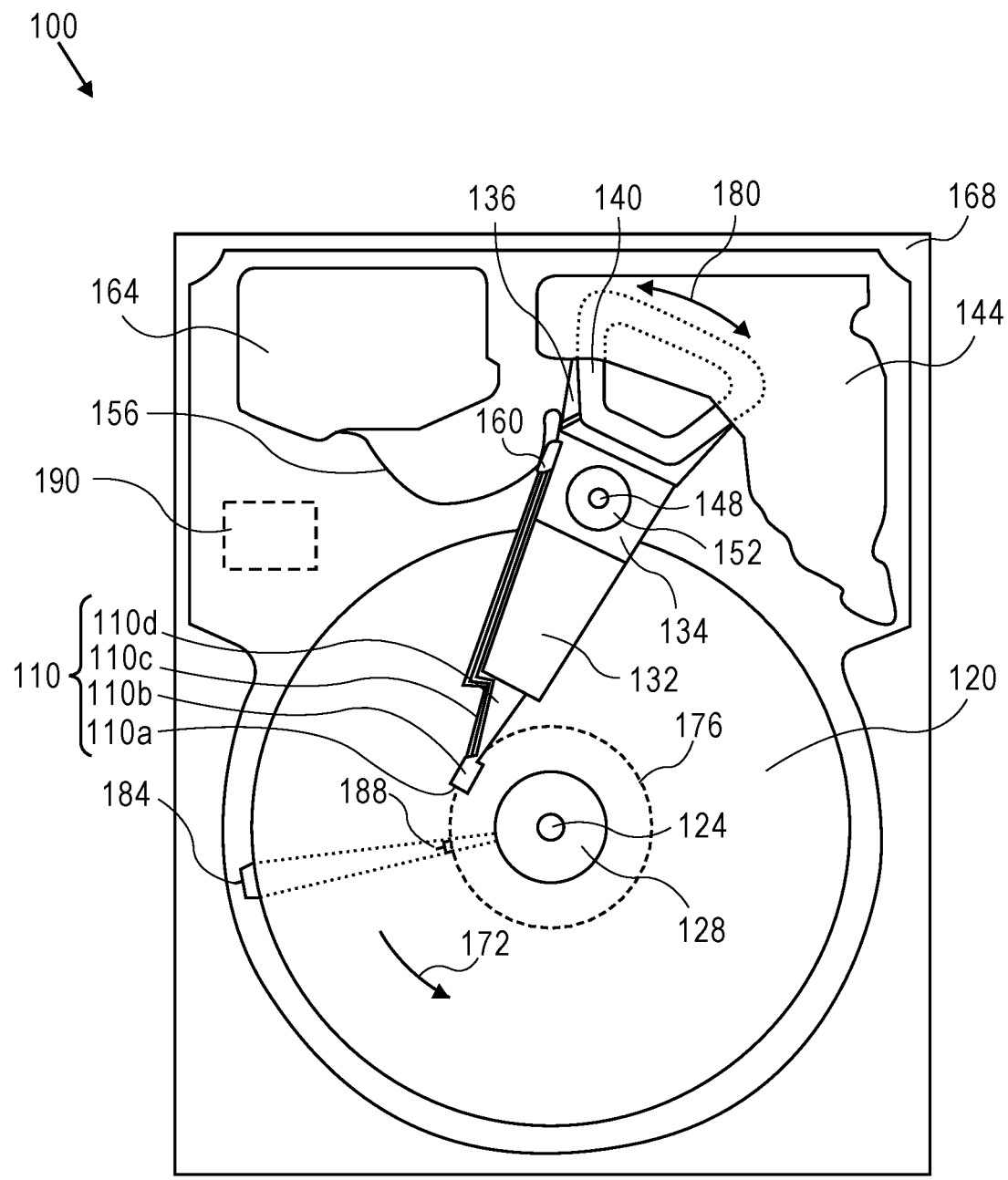
FIG. 1 is a plan view illustrating a hard disk drive, according to an embodiment.

Generally, approaches to mitigating disk media curvature in a hard disk drive (HDD) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that the number of disks in a given form factor may be increased to increase storage capacity. Consequently, implementation of thinner recording disks (or simply "disks") may be considered. However, generally, the thinner the disks the poorer the flatness control of the disks, which is simply a fundamental result of the substrate and media manufacturing processes (such as due to stresses to the substrate caused by inconsistent magnetic plating deposited on each side of the disk). Non-flat (also "non-planar" or "irregular" or "warped") disks typically take one of various main forms, such as those referred to as bowl (e.g., concave), umbrella (e.g., convex), and saddle (e.g., shaped in the form of a horse's saddle, as in bent down at the sides so as to give the upper part a rounded form).

Figure 2:
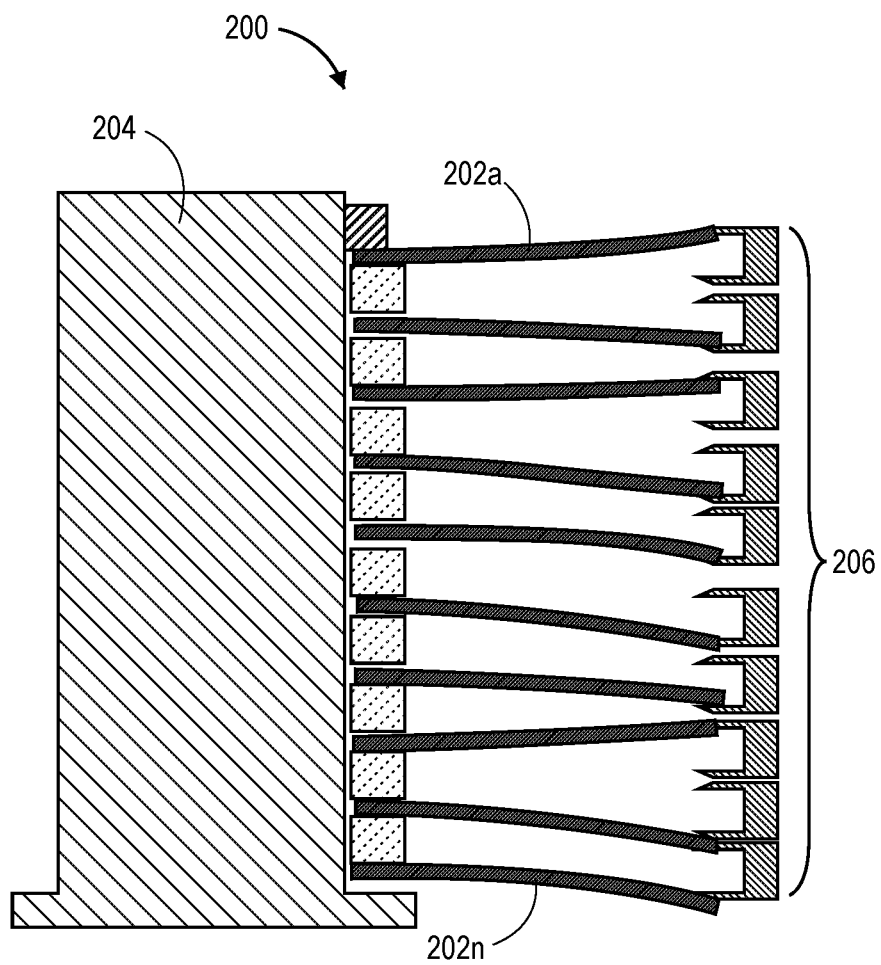
FIG. 2 is a cross-sectional side view illustrating a disk stack and corresponding load/unload ramp.

FIG. 2 is a cross-sectional side view illustrating a disk stack and corresponding load/unload ramp. Disk stack 200 comprises a plurality of recording disks 202a-202n (or "hard disks" or simply "disks"), such as magnetic-recording disks, where n represents an arbitrary number of disks (here, ten) that may vary from implementation to implementation. Disks 202a-202n are mounted on a spindle 204 for rotation. Typically adjacent to or even somewhat overlapping with the disks 202a-202n is one or more load/unload (LUL) ramp 206 structure(s). LUL ramp technology involves a mechanism that moves the head stack assembly (HSA), including the read-write head sliders (see, e.g., slider 110b that includes a magnetic read-write head 110a of FIG. 1), away from and off the disks 202a-202n and safely positions them onto a cam-like structure. The cam typically includes for each slider a shallow ramp portion on the side closest to the disk, which merges with a typically horizontal "parking" area that may have a detent feature to hold the corresponding slider in place. During a power-on sequence, for example, the read-write heads (e.g., read-write head 110a) are loaded by moving the sliders (e.g., sliders 110b) off the LUL ramp 206 and over the disk 202a-202n surfaces when the disks reach the appropriate rotational speed. Thus, the terminology used is that the sliders or HSA are "loaded" to or over the disk (i.e., off the ramp) into an operational position, and "unloaded" from the disk (i.e., onto the ramp) such as in an idle position.

However, in view of irregular disks 202a-202n having poor flatness control, such as with thinner disks (for a non-limiting example, 0.45 millimeters (mm) thick), the disk stack 200 of FIG. 2 illustrates (in exaggerated format) that random incorporation of irregular disks 202a-202n onto spindle 204 may very well cause a mismatch or misalignment with the corresponding LUL ramp 206, which is operationally problematic. Thus, challenges remain with increasing the number of disks in a given form factor in view of HDD load/unload and op-shock requirements, such as due to disk stack tolerance stack-up, and poor disk flatness in particular.

Curvature-Mitigated Disk Stack

According to an embodiment, hard disk drive (HDD) disk stack tolerance stack-up and op-shock performance, for example, can be improved if known-shaped disks are placed in certain, controlled positions in the disk stack. Likewise, the LUL ramp can be designed to align ramp tips with the expected disk height at the outer diameter (OD) of each of the disks.

Figure 3B:
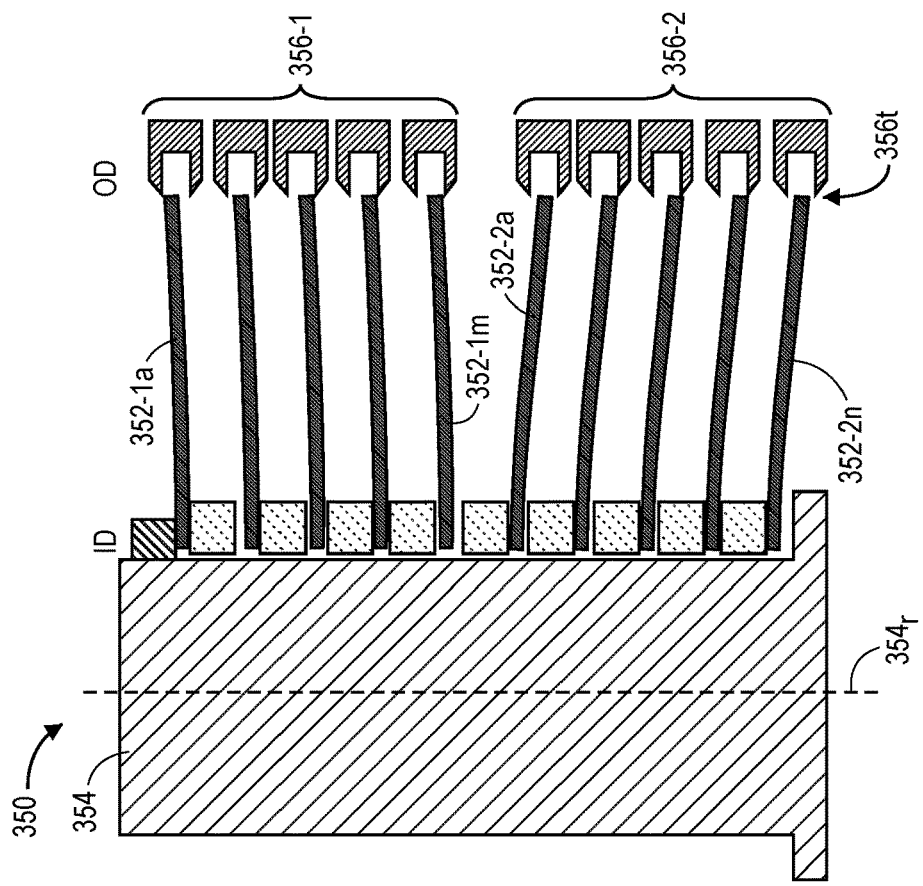
FIG. 3B is a cross-sectional side view illustrating a curvature-mitigated disk stack and corresponding load/unload ramp, according to an embodiment.
Figure 3A:
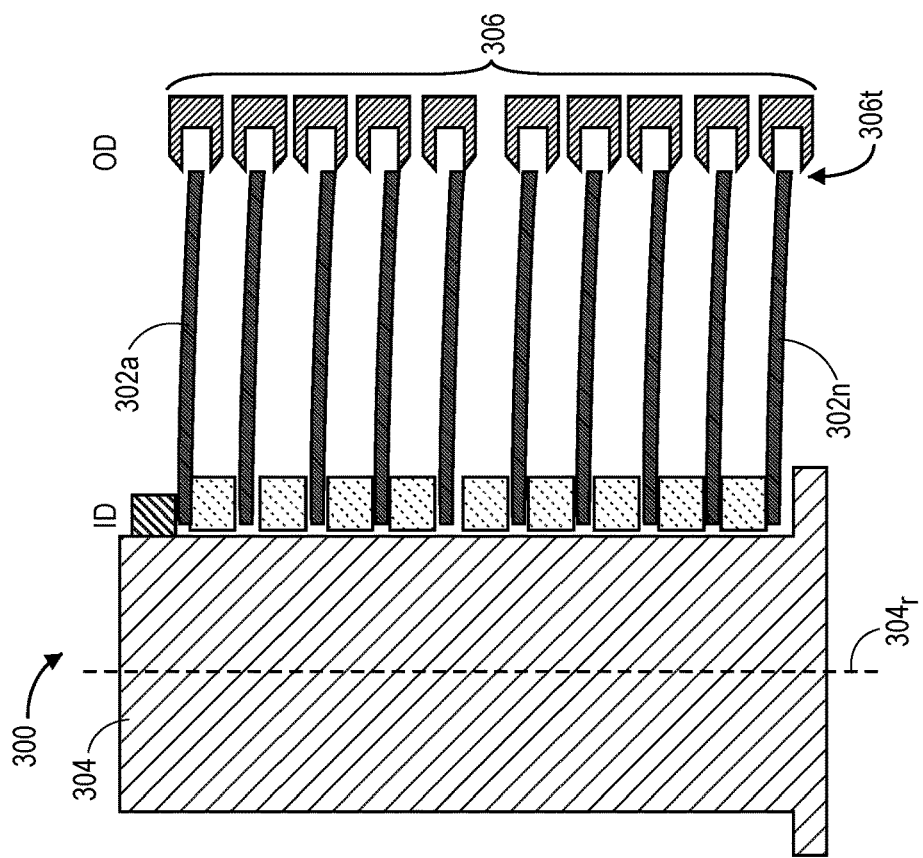
FIG. 3A is a cross-sectional side view illustrating a curvature-mitigated disk stack and corresponding load/unload ramp, according to an embodiment.

FIG. 3A is a cross-sectional side view illustrating a curvature-mitigated disk stack and corresponding load/unload ramp, according to an embodiment. Disk stack 300 comprises a plurality of recording disks 302a-302n (or simply "disks"), such as magnetic-recording disks, where n represents an arbitrary number of disks (here, ten) that may vary from implementation to implementation. Disks 302a-302n are rotatably mounted on a spindle 304. Adjacent to or somewhat overlapping with the disks 302a-302n is one or more load/unload (LUL) ramp 306 structure(s), operating or functioning the same as or similarly to as described in reference to ramp 206 (FIG. 2). Here, rather than randomly incorporating irregular disks onto spindle 304, disks 302a-302n are sorted (e.g., before or during assembly of the disks onto the spindle) by their irregularity characteristic, and similarly-characterized irregular disks 302a-302n are mounted together on the same spindle 304. For example, bowl disks are assembled together on the same spindle, and/or umbrella disks are respectively assembled together on the same spindle, and/or saddle disks are respectively assembled together on the same spindle. Here, all the disks 302a-302n are depicted as umbrella-shaped (in exaggerated format), for purposes of example, while noting that each of the other irregular-shaped disk forms may be similarly grouped and mounted on a respective spindle.

The point being that disks 302a-302n having a similar irregular shape are assembled together, to avoid random misalignments between disks 302a-302n and corresponding ramp(s) 306 (e.g., where the ramp tip end closest to the disk may be used as frame of reference relative to alignment), such as illustrated and described in reference to disk stack 200 of FIG. 2. As such, one way to characterize this approach to implementation of irregular or non-planar disks is to describe the disk media as having an outer diameter (OD) that is offset from its inner diameter (ID), thus describing an irregular or non-planar or warped set of disks such as those referred to as bowl, umbrella, saddle, or otherwise. In the embodiment illustrated in FIG. 3A the plurality of disks 302a-302n mounted on the spindle 304, whose ODs are offset from their IDs in a same direction (e.g., along an axis of rotation 304r of the spindle), consists of all of the disk media mounted on the spindle 304.

Not only are similarly-characterized irregular disks 302a-302n (e.g., characterized based on form and/or amount of ID-OD offset) mounted together on the same spindle 304, furthermore and according to an embodiment the LUL ramp(s) 306 is positioned to align in correspondence with (or in alignment with) the OD of the disk media, i.e., disks 302a-302n. As mentioned, one approach to aligning the LUL ramp(s) 306 with the group of similarly-characterized irregular disks 302a-302n is to align the ramp tips 306t (e.g., the primary sloped portion of the ramp 306, typically closest to the disk media) with the expected disk height at the outer diameter (OD) of each of the disks. Note that such alignment may vary from implementation to implementation, where other portions or points of ramp 306 may serve as the point of reference for alignment with the disks 302a-302n, in the broader context of LUL ramp technology generally and the corresponding desired load and unload procedures for a given HDD design. That is to say that aligning the ramp 306 with the disks 302a-302n does not necessarily require that the corresponding components are precisely aligned, such as end point of ramp tip 306t to disk 302a-302n OD point, but that other considerations of load/unload technology may be considered in the context of aligning the corresponding components.

Note that slider load/unload processes are not simple or trivial. For example, the physical configuration of a ramp can affect the amount that the sliders are lifted as well as the speed at which they are loaded and unloaded. At unloading, the slider moves up and away from the disk first, and then typically moves back down toward the disk, a phenomenon referred to herein as slider "rebound". More particularly, the slider is lifted gradually by way of a lift tab extending from the end of the suspension load beam mechanically interacting with and thereby being lifted on the ramp slope, while the gramload on the slider is decreasing gradually. Here, the term "gramload" generally refers to the spring load of the entire suspension and slider assembly. However, the slider air bearing surface (ABS) forces include not only a positive lift force for flying over the disk but also a negative suction force. Therefore, even while the gramload is decreasing the slider is still being pulled close to the disk for some duration (due to the suction) until the ABS breaks from or overcomes the suction force. Once enough lifting is achieved to overcome the ABS forces, the slider typically moves upward rapidly. Because the suspension (including the flexure) acts as a spring, once the slider moves high it then returns to low (i.e., closer to the disk), and then continues the high-low loop (e.g., slider oscillation) with damping, until the slider oscillation finally ends. The point here reinforces the notion that properly aligning the ramp 306 with the OD of the disks 302a-302n may be more complex than and entail more considerations than simply physically and linearly aligning certain portions of the structure of the corresponding components.

Furthermore, there are a number of ways in which ramp 306 may be aligned in correspondence with the disk media. For manufacturing simplicity, according to one embodiment the ramp 306 position and its alignment with the disks 302a-302n is not adaptive from HDD to HDD, rather a common disk-ramp interface is designed to be static based, for example, on a mean or average disk irregularity (e.g., curvature or ID-OD offset). For example, if disk non-planarity over a significant number of samples is found to have a certain offset, then a static ramp design and/or vertical positioning within corresponding HDDs can be implemented accordingly. For example, the ramp seating surface of its corresponding structural base (see, e.g., HDD housing 168 of FIG. 1) may be machined more or less from the nominal, to effectively lower or raise the ramp from nominal, for HDDs for which this curvature mitigation approach is implemented. It may also be that a different ramp 306 is used for each of the respective characteristic forms of the corresponding irregular disks 302a-302n, according to an embodiment. Alternatively, it may be that the bottom interface/attachment of the ramp 306 with its corresponding structural base may be implemented to be variable, such that the ramp 306 is able to be assembled with the base at a variable height (such as using something akin to a set screw, for a non-limiting example), such as based on the specific characteristic form of the corresponding irregular disks 302a-302n mounted on spindle 304, according to an embodiment.

While assembling together a set of umbrella-shaped irregular disks 302a-302n such as illustrated in FIG. 3A may be preferred, e.g., to limit the risk of ramp-cover interference due to the disk stack tolerance stack-up that reaches its maximum at the top disk 302a, other irregular disk stack configurations are considered. FIG. 3B is a cross-sectional side view illustrating a curvature-mitigated disk stack and corresponding load/unload ramp, according to an embodiment. Here also, rather than randomly incorporating irregular disks onto spindle 354, the disks are sorted by their irregularity characteristic, and similarly-characterized irregular disks are mounted together on the same spindle 354.

Here, the plurality of disk media comprises a first group of disk media, disks 352-1a through 352-1m where m represents an arbitrary number of disks (here, five) that may vary from implementation to implementation, and a second group of disk media, disks 352-2a through 352-2n where n represents an arbitrary number of disks (here, five) that may vary from implementation to implementation. As depicted, each of the first group of disks 352-1a through 352-1m is rotatably mounted on a spindle 354 with an outer diameter offset from an inner diameter in a same first direction along the axis of rotation 354r of the spindle 354, and each of the second group of disks 352-2a through 352-2n is rotatably mounted on the spindle 354 with an outer diameter offset from an inner diameter in a same opposing second direction along the axis of rotation 354r of the spindle 354. As depicted for purposes of example, disks 352-1a through 352-1m are all bowl-shaped (in exaggerated format) and disks 352-2a through 352-2n are all umbrella-shaped (in exaggerated format).

Likewise, the LUL ramp comprises a first ramp portion 356-1 and a second ramp portion 356-2, where the first ramp portion 356-1 (e.g., corresponding ramp tips 356t) is positioned to align in correspondence with the outer diameters of the first disks 352-1a through 352-1m, and the second ramp portion 356-2 (e.g., corresponding ramp tips 356t) is positioned to align in correspondence with the outer diameters of the second disks 352-2a through 352-2n. For example, the top ramp portion 356-1 may be shifted up 20 μm (micrometers, or microns) from the nominal while the bottom ramp portion 356-2 is shifted down 20 μm from the nominal, both to align with their corresponding disk sub-stack 352-1a through 352-1m and 352-2a through 352-2n, respectively. Furthermore and according to an embodiment, the top disks 352-1a through 352-1m may be grouped together based on their similar mean irregularity (ID-OD offset of 10 micron) while the bottom disks 352-2a through 352-2n are grouped together based on their similar mean irregularity (ID-OD offset of 25 micron) that is different from the top disks 352-1a through 352-1m. Therefore, the top ramp portion 356-1 would be shifted up around 10 μm from the nominal while the bottom ramp portion 356-2 would be shifted down around 25 μm from the nominal, both to align with their corresponding disk sub-stack 352-1a through 352-1m and 352-2a through 352-2n, respectively.

Method for Assembling a Hard Disk Drive

Figure 4:
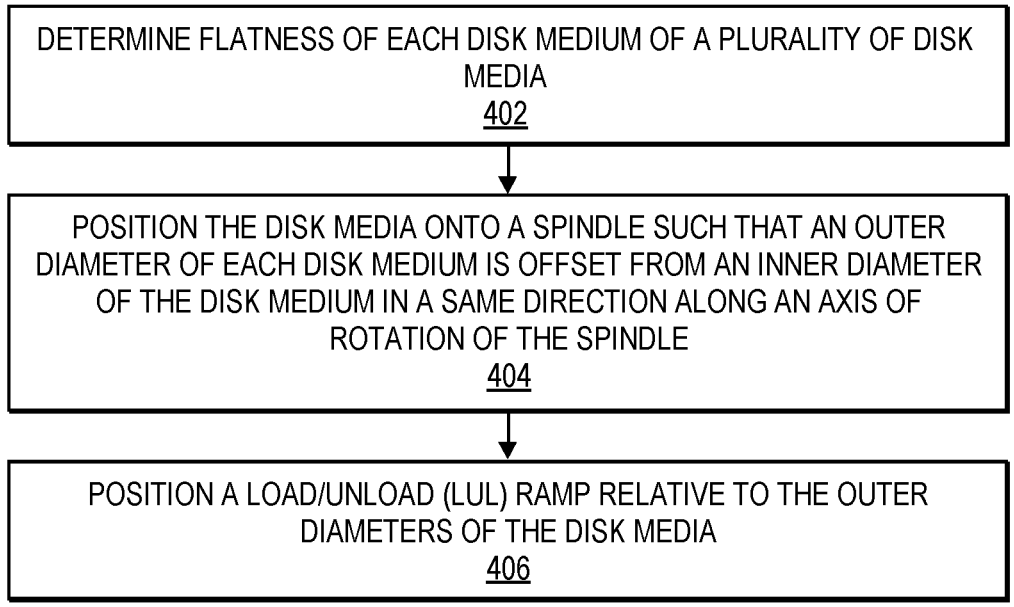
FIG. 4 is a flow diagram illustrating a method for assembling a hard disk drive, according to an embodiment.

FIG. 4 is a flow diagram illustrating a method for assembling a hard disk drive, according to an embodiment. For example, the method of FIG. 4 can be used to build embodiments of disk stacks illustrated and described in reference to FIGS. 3A-3B.

At block 402, determine the flatness of each disk medium of a plurality of disk media. For example, any of a number of conventional measuring tools, machines, operations, etc. may be used to measure the flatness, or lack thereof, of a group of disk media such as disks 302a-302n (FIG. 3A), 352-1a through 352-1m (FIG. 3B), 352-2a through 352-2n (FIG. 3B). According to an embodiment, disks 302a-302n, 352-1a through 352-1m, 352-2a through 352-2n are then sorted based on the determined flatness, and oriented into corresponding disk cassettes based on similar flatness and with their outer diameters offset from their inner diameters in the same direction within each corresponding disk cassette, for readily positioning the disk media from each disk cassette onto a spindle with their outer diameters offset from their inner diameters in the same direction. Such pre-orienting of the disk media in corresponding disk cassettes may be performed as part of media manufacturing/testing process, or as part of HDD manufacturing/testing process, for example. Regardless, once similarly-characterized disks are oriented in cassettes, they can be installed/assembled onto the spindle serially per usual manufacturing procedure.

At block 404, position the disk media onto a spindle such that an outer diameter of each disk medium is offset from an inner diameter of the disk medium in a same direction along an axis of rotation of the spindle. For example, disks 302a-302n, 352-1a through 352-1m, 352-2a through 352-2n are positioned onto respective spindle 304 (FIG. 3A), 354 (FIG. 3B) such that the OD of each disk is offset from the ID of the disk in the same direction along an axis of rotation 304r, 354r of the spindle 304, 354. In the case of disk stack 300 of FIG. 3A, disks 302a-302n are all positioned as umbrella-shaped with their ODs offset lower than their IDs. In the case of disk stack 350 of FIG. 3B, disks 352-1a through 352-1m are all positioned as bowl-shaped with their ODs offset higher than their IDs and disks 352-2a through 352-2n are all positioned as umbrella-shaped with their ODs offset lower than their IDs.

According to an embodiment, after determining flatness (block 402) and prior to positioning onto the spindle (block 404), each disk medium is marked as to whether the disk medium should be positioned onto the spindle as a first group of disk media with their outer diameters offset from their inner diameters in a same first direction along the axis of rotation of the spindle or the disk medium should be positioned as a second group of disk media with their outer diameters offset from their inner diameters in a same opposing second direction along the axis of rotation of the spindle. For example, disks 302a-302n and 352-2a through 352-2n may all be similarly marked (e.g., with a bar code), along with other similarly shaped disks, to indicate that these disks are to be assembled onto the respective spindle 304, 354 as umbrella-shaped disks (OD lower than ID), while disks 352-1a through 352-1m may all be similarly marked (e.g., with a bar code), along with other similarly shaped disks, to indicate that these disks are to be assembled onto the respective spindle 354 as bowl-shaped disks (OD higher than ID). Thus, each disk marking can be read at assembly time (e.g., by a robotic machine) to determine how such disks 302a-302n, 352-1a through 352-1m, 352-2a through 352-2n should be oriented and assembled onto the corresponding spindle 304, 354. Alternatively to reading at assembly time, the marked disks 302a-302n, 352-1a through 352-1m, 352-2a through 352-2n may be sorted based on their respective marking and oriented into corresponding disk cassettes based on their marking, with their outer diameters offset from their inner diameters in the same direction within each corresponding disk cassette, for readily positioning the disk media from each disk cassette onto a spindle with their outer diameters offset from their inner diameters in the same direction.

According to an embodiment, disks 302a-302n, 352-1a through 352-1m, 352-2a through 352-2n may be sorted based on the determined flatness, packaged into corresponding disk cassettes based on the type or form or characterization, and the disk cassettes assigned to corresponding disk installation stations based on the type.

At block 406, position a load/unload (LUL) ramp relative to the outer diameters of the disk media. For example, ramp 306 (FIG. 3A), 356-1 and 356-2 (FIG. 3B) is positioned in alignment with or relative to the ODs of the respective disks 302a-302n, 352-1a through 352-1m, 352-2a through 352-2n, as described in more detail elsewhere herein. Hence the error in alignment between disks and ramps is minimized, improving load/unload tolerances and op-shock performance, and enabling more disks to be added to the same standard HDD form factor.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
   a plurality of disk media rotatably mounted on a spindle, wherein in an undisturbed state an outer diameter of each disk medium is offset from an inner diameter of the disk medium in a same direction along an axis of rotation of the spindle; and
   a load/unload (LUL) ramp positioned, based on the offset, to align in correspondence with the outer diameters of the disk media;
   wherein:
      the plurality of disk media comprises a first group of disk media;
      the HDD further comprises a second group of disk media;
      the LUL ramp comprises a first ramp portion and a second ramp portion;
      each disk medium of the first group of disk media is rotatably mounted on the spindle with an outer diameter offset from an inner diameter in a same first direction along the axis of rotation of the spindle;
      the first ramp portion is positioned, based on the offset in the first direction, to align in correspondence with the outer diameters of the first group of disk media;
      each disk medium of the second group of disk media is rotatably mounted on the spindle with an outer diameter offset from an inner diameter in a same opposing second direction along the axis of rotation of the spindle; and
      the second ramp portion is positioned, based on the offset in the second direction, to align in correspondence with the outer diameters of the second group of disk media.

2. The HDD of claim 1, wherein the plurality of disk media consists of all of the disk media mounted on the spindle.

3. The HDD of claim 1, wherein:
   the first group of disk media consists of a top half of the disk media mounted on the spindle; and
   the second group of disk media consists of a bottom half of the disk media mounted on the spindle.

4. The HDD of claim 1, wherein each disk medium of the plurality of disk media is substantially equal to or less than 0.5 millimeters (mm) thick.

5. The HDD of claim 1, further comprising:
a plurality of head sliders, each head slider housing a read-write transducer configured to read from and to write to a respective disk medium of the plurality of disk media; and
an actuator configured for moving the plurality of head sliders to access portions of the disk media.

6. The HDD of claim 1, further comprising:
an enclosure base;
wherein the LUL ramp is configured to be variably positioned relative to the enclosure base.

7. The HDD of claim 1, wherein:
the first ramp portion is positioned based on a first offset distance in the first direction; and
the second ramp portion is positioned based on a second offset distance in the second direction that is different from the first offset distance.

8. A method for assembling a hard disk drive (HDD), the method comprising:
determining flatness of each disk medium of a plurality of disk media;
based on the determined flatness, positioning at least some of the plurality of disk media onto a spindle of the HDD such that an outer diameter of each disk medium is offset from an inner diameter of the disk medium in a same direction along an axis of rotation of the spindle; and
positioning a load/unload (LUL) ramp within the HDD, based on the offset, relative to the outer diameters of the at least some disk media;
wherein:
the plurality of disk media comprises a first group of disk media;
the LUL ramp comprises a first ramp portion and a second ramp portion;
positioning the at least some disk media includes:
positioning each disk medium of the first group of disk media with its outer diameter offset from its inner diameter in a same first direction along the axis of rotation of the spindle, and
positioning each disk medium of a second group of disk media with its outer diameter offset from its inner diameter in a same opposing second direction along the axis of rotation of the spindle; and
positioning the LUL ramp includes:
positioning the first ramp portion, based on the offset in the first direction, to align in correspondence with the outer diameters of the first group of disk media, and
positioning the second ramp portion, based on the offset in the second direction, to align in correspondence with the outer diameters of the second group of disk media.

9. The method of claim 8, wherein positioning the at least some disk media includes positioning all of the disk media with their outer diameters offset from their inner diameters in the same direction.

10. The method of claim 8, wherein:
positioning the first group of disk media includes positioning the first group as a top half of the disk media; and
positioning the second group of disk media includes positioning the second group as a bottom half of the disk media.

11. The method of claim 8, further comprising:
sorting the plurality of disk media based on the determined flatness; and
orienting the sorted disk media into corresponding disk cassettes based on similar flatness and with their outer diameters offset from their inner diameters in the same direction within each corresponding disk cassette, for positioning the disk media from each disk cassette onto the spindle with their outer diameters offset from their inner diameters in the same direction.

12. The method of claim 8, further comprising:
after determining flatness and prior to positioning onto the spindle, marking each disk medium as to whether the disk medium should be positioned onto the spindle as a first group of disk media with their outer diameters offset from their inner diameters in a same first direction along the axis of rotation of the spindle or the disk medium should be positioned as a second group of disk media with their outer diameters offset from their inner diameters in a same opposing second direction along the axis of rotation of the spindle.

13. The method of claim 12, further comprising:
sorting the plurality of disk media based on their marking; and
orienting the sorted disk media into corresponding disk cassettes based on their marking and with their outer diameters offset from their inner diameters in the same direction within each corresponding disk cassette.

14. The method of claim 8, further comprising:
sorting the plurality of disk media based on type based on the determined flatness;
packaging the disk media into corresponding disk cassettes based on the type; and
assigning the disk cassettes to corresponding disk installation stations based on the type.

15. A hard disk drive (HDD) comprising:
a disk stack comprising a plurality of disk media rotatably mounted on a spindle, wherein in an undisturbed state an outer diameter of each disk medium is offset from an inner diameter of the disk medium in a same direction along an axis of rotation of the spindle;
a plurality of head sliders each housing a read-write transducer configured to read from and to write to a respective disk medium of the disk stack;
means for moving the plurality of head sliders to access portions of the plurality of disk media; and
means for supporting loading the plurality of head sliders onto the disk stack and for supporting unloading the plurality of head sliders from the disk stack, the means for supporting positioned, based on the offsets of the plurality of disk media, to align in correspondence with the outer diameters of the plurality of disk media;
wherein:
the plurality of disk media comprises a first group of disk media;
the HDD further comprises a second group of disk media;
the LUL ramp comprises a first ramp portion and a second ramp portion;
each disk medium of the first group of disk media is rotatably mounted on the spindle with an outer diameter offset from an inner diameter in a same first direction along the axis of rotation of the spindle;
the first ramp portion is positioned to align, based on the offset in the first direction, in correspondence with the outer diameters of the first group of disk media;
each disk medium of the second group of disk media is rotatably mounted on the spindle with an outer diameter offset from an inner diameter in a same opposing second direction along the axis of rotation of the spindle; and the second ramp portion is positioned to align, based on the offset in the second direction, in correspondence with the outer diameters of the second group of disk media.

16. The HDD of claim 15, wherein the plurality of disk media consists of all of the disk media mounted on the spindle.

17. The HDD of claim 15, wherein:

the first group of disk media consists of a top half of the disk media mounted on the spindle; and the second group of disk media consists of a bottom half of the disk media mounted on the spindle.

* * * * *